United States Patent
Kajuluri et al.

(10) Patent No.: US 11,791,999 B2
(45) Date of Patent: Oct. 17, 2023

(54) VEHICLE ELECTRONIC CONTROL UNIT AUTHENTICATION

(71) Applicant: Ford Global Technologies, LLC, Dearborn, MI (US)

(72) Inventors: Venkata Kishore Kajuluri, Southgate, MI (US); Xin Ye, Farmington Hills, MI (US); Bradley Warren Smith, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 304 days.

(21) Appl. No.: 17/178,359

(22) Filed: Feb. 18, 2021

(65) Prior Publication Data
US 2022/0263649 A1    Aug. 18, 2022

(51) Int. Cl.
| | |
|---|---|
| H04L 9/08 | (2006.01) |
| G07C 5/00 | (2006.01) |
| H04L 7/00 | (2006.01) |
| B60R 16/023 | (2006.01) |
| H04L 67/12 | (2022.01) |
| G07C 5/04 | (2006.01) |

(52) U.S. Cl.
CPC .......... *H04L 9/088* (2013.01); *B60R 16/0232* (2013.01); *G07C 5/008* (2013.01); *G07C 5/04* (2013.01); *H04L 7/0008* (2013.01); *H04L 67/12* (2013.01)

(58) Field of Classification Search
CPC ....... H04L 9/088; H04L 7/0008; H04L 67/12; B60R 16/0232; G07C 5/008; G07C 5/04
USPC ........................................................ 713/171
See application file for complete search history.

(56) References Cited

U.S. PATENT DOCUMENTS

| | | | |
|---|---|---|---|
| 5,861,816 A * | 1/1999 | Funakoshi | B60R 25/04 235/382 |
| 10,581,609 B2 | 3/2020 | Wairant | |
| 10,630,481 B2 | 4/2020 | Lawlis et al. | |
| 2010/0268980 A1 * | 10/2010 | Watanabe | H04L 12/40136 714/48 |
| 2018/0270052 A1 | 9/2018 | Cullen | |
| 2019/0238555 A1 | 8/2019 | Buffard et al. | |
| 2020/0007319 A1 * | 1/2020 | Herzerg | H04L 9/0819 |
| 2020/0213287 A1 | 7/2020 | Zhang et al. | |

* cited by examiner

*Primary Examiner* — Bryan F Wright
(74) *Attorney, Agent, or Firm* — Brandon Hicks; Bejin Bieneman PLC (57) ABSTRACT

A vehicle communication network is monitored to detect a plurality of electronic control units (ECUs). Upon identifying a new ECU in the plurality of ECUs, a highest ECU trip counter is determined from the plurality of ECUs. A global trip counter stored in the memory is updated based on the highest ECU trip counter. The updated trip global trip counter is greater than the highest ECU trip counter. Then a replacement synchronization message is provided to the plurality of ECUs on the vehicle communication network. The replacement synchronization message includes the updated global trip counter.

20 Claims, 5 Drawing Sheets

VEHICLE ELECTRONIC CONTROL UNIT AUTHENTICATION

BACKGROUND

Vehicles can be equipped with computers, networks, sensors, and/or controllers to acquire data regarding the vehicle's environment and/or to operate vehicle components. Vehicle sensors can provide data about a vehicle's environment, e.g., concerning routes to be traveled and objects in the vehicle's environment to be avoided. Various computing devices or controllers such as electronic control units (ECUs) can be provided in a vehicle and can communicate via a vehicle network. Messages sent and received via the vehicle network can relate to operating the vehicle, and can include sensor data, actuation commands, fault reports, etc. A vehicle computing device can operate a vehicle and make real-time decisions based on data received from sensors and/or computing devices.

DETAILED DESCRIPTION

A system includes a computer including a processor and a memory, the memory storing instructions executable by the processor to monitor a vehicle communication network to detect a plurality of electronic control units (ECUs). The instructions further include instructions to, upon identifying a new ECU in the plurality of ECUs, determine, from the plurality of ECUs, a highest ECU trip counter. The instructions further include instructions to update a global trip counter stored in the memory based on the highest ECU trip counter. The updated global trip counter is greater than the highest ECU trip counter. The instructions further include instructions to then provide a replacement synchronization message to the plurality of ECUs on the vehicle communication network. The replacement synchronization message includes the updated global trip counter.

The instructions can further include instructions to, upon failing to detect the new ECU, provide a synchronization message to the plurality of ECUs on the vehicle communication network based on incrementing the global trip counter. The synchronization message can include the incremented global trip counter.

The instructions can further include instructions to provide the synchronization message to the plurality of ECUs on the vehicle communication network based additionally on incrementing a reset counter. The synchronization message can include the reset counter.

The instructions can further include instructions to increment the reset counter based on a timer expiring.

The instructions can further include instructions to increment the global trip counter based on detecting a vehicle startup.

The instructions can further include instructions to generate the synchronization message by inputting a counter message to a cryptographic program that encodes the counter message based on an authentication key. The counter message can include the incremented global trip counter and a reset counter.

The plurality of ECUs can include respective processors and respective memories storing instructions executable by the respective processors to determine the incremented global trip counter in the synchronization message based on an authentication key. The instructions can further include instructions to update an ECU trip counter based on determining that the incremented global trip counter is greater than the ECU trip counter.

The instructions can further include instructions to ignore data messages based on determining that the incremented global trip counter is less than the ECU trip counter.

The instructions can further include instructions to store data messages based on determining that the incremented global trip counter is equal to the ECU trip counter.

The instructions can further include instructions to, upon updating the global trip counter, provide an authentication key to the new ECU.

The new ECU can include a second processor and a second memory storing instructions executable by the second processor to determine the updated global trip counter in the replacement synchronization message based on the authentication key. The instructions can further include instructions to update an ECU trip counter based on determining that the updated global trip counter is greater than the ECU trip counter.

The instructions can further include instructions to, after updating the ECU trip counter, store data messages based on determining that the updated global trip counter is equal to the ECU trip counter.

The instructions can further include instructions to generate the replacement synchronization message by inputting a replacement counter message to a cryptographic program that encodes the replacement counter message based on an authentication key. The replacement counter message can include the updated global trip counter and a reset counter.

The plurality of ECUs can include respective processors and respective memories storing instructions executable by the respective processors to update an ECU trip counter based on determining the updated global trip counter is greater than the ECU trip counter.

The instructions can further include instructions to update the global trip counter by setting the global trip counter equal to the highest ECU trip counter and then incrementing the global trip counter.

A method includes monitoring a vehicle communication network to detect a plurality of electronic control units (ECUs). The method further includes, upon identifying a new ECU in the plurality of ECUs, determining, from the plurality of ECUs, a highest ECU trip counter. The method further includes updating a global trip counter stored in the memory based on the highest ECU trip counter. The updated trip global trip counter is greater than the highest ECU trip counter. The method further includes then providing a replacement synchronization message to the plurality of ECUs on the vehicle communication network, the replacement synchronization message including the updated global trip counter.

The method can further include, upon failing to detect the new ECU, providing a synchronization message to the plurality of ECUs on the vehicle communication network based on incrementing the global trip counter. The synchronization message can include the incremented global trip counter.

The method can further include generating the replacement synchronization message by inputting a replacement counter message to a cryptographic program that encodes the replacement counter message based on an authentication key. The replacement counter message can include the updated global trip counter and a reset counter.

The method can further include updating an ECU trip counter based on determining the updated global trip counter is greater than the ECU trip counter.

The method can further include updating the global trip counter by setting the global trip counter equal to the highest ECU trip counter and then incrementing the global trip counter.

Further disclosed herein is a computing device programmed to execute any of the above method steps. Yet further disclosed herein is a computer program product, including a computer readable medium storing instructions executable by a computer processor, to execute an of the above method steps.

Upon identifying a new computing device in a vehicle, a vehicle computer can determine counters stored in respective memories of a plurality of electronic control units (ECUs) in the vehicle. The vehicle computer updates a counter stored in a memory to be greater than a highest ECU counter. The vehicle computer then provides a message to the ECUs to synchronize the ECU counters with the updated vehicle computer counter. Updating the vehicle computer counter and synchronizing the ECU counters with the vehicle computer counter allows the ECUs and the vehicle computer to communicate with the new computing device.

As disclosed herein, it is possible to reduce risk that a vehicle computer and/or a plurality of ECUs will send, receive, and/or act on false, e.g., spoofed by an attacker, data, which is data injected into the vehicle communication network by an unauthorized source (i.e., a source other than one of the vehicle sensors or other authorized computing devices). For example, during vehicle operations, data captured by sensors are passed to the vehicle computer and/or ECUs. Based on the data, the vehicle computer and/or ECUs can generate control signals to vehicle components that carry out vehicle operations. Difficulties can arise, however, if the data provided to the vehicle computer and/or ECUs are not authentic. An example of inauthentic data may include data presented to the vehicle computer and/or ECUs via an injection attack. An injection attack occurs when false data (e.g., data that is different from the data detected by the vehicle sensors) are maliciously uploaded to the vehicle communication network.

As disclosed herein, a message authentication code can be employed to limit the likelihood that the vehicle computer and/or ECUs will act based on false data. In this context, a message authentication code is a data string that indicates an authorized source provided a set of data in which the data string is included. Some authentication techniques, such as authentication techniques that include a same message authentication code into every data set, may be vulnerable to attacks from an intruder device. In such attacks, the intruder device has knowledge of the message authentication code algorithm and can estimate the message authentication code using a sample data set. The intruder device can include the message authentication code into false data and inject the false data into the communication channel between the vehicle computer and/or ECUs. Because the false data includes the expected message authentication code, the vehicle computer and/or ECUs may incorrectly recognize the false data as accurate data, resulting in the vehicle computer and/or ECUs relying on the false data.

One or more counters may be stored and incremented at various times or in response to various vehicle operations. The one or more counters may be used to generate updated message authentication codes to reduce the likelihood that the intruder device can estimate the message authentication code. However, the vehicle computer and/or ECUs may be replaced or supplemented with new computing devices, i.e., in the context of the present document, a new computing device is a computer, ECU, etc., that is added to a vehicle communication network. In this situation, a new computing device may have a counter stored in a memory, such that the new computing device is unable to communicate on the vehicle communication network.

Advantageously, the vehicle computer can generate a replacement synchronization message based on incrementing a global trip counter at vehicle startup and incrementing a reset counter during vehicle operations. The vehicle computer can provide the replacement synchronization message to the ECUs. Incrementing the global trip counter at vehicle startup and the reset counter during vehicle operations can prevent intruder devices from determining the message authentication code, which can prevent the attack discussed above. Additionally, when a new computing device is detected on the vehicle communication network, the vehicle computer can determine a highest ECU trip counter from the ECUs on the vehicle communication network. The vehicle computer can then update the global trip counter based on the highest ECU trip counter and can provide the updated global trip counter to the ECUs, which allows the ECUs and the vehicle computer to communicate via the vehicle communication network.

Figure 1:
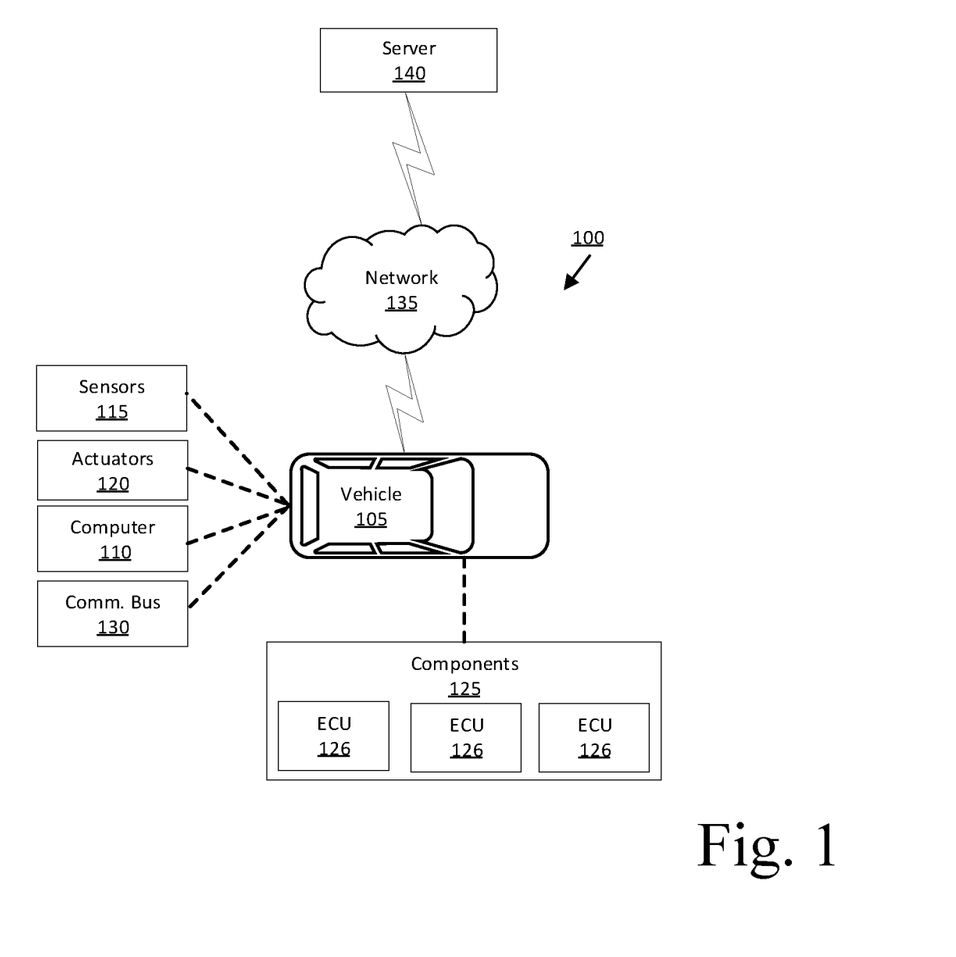
FIG. 1 is a block diagram illustrating an example vehicle control system for a vehicle.

With reference to FIGS. 1-2, an example vehicle control system 100 includes a vehicle 105. A vehicle computer 110 in the vehicle 105 receives data from sensors 115. The vehicle computer 110 is programmed to monitor a vehicle communication network to detect a plurality of electronic control units (ECUs) 126. The vehicle computer 110 is further programmed to determine, upon detecting a new ECU 126 in the plurality of ECUs 126, a highest ECU trip counter from the plurality of ECUs 126. The vehicle computer 110 is further programmed to update a global trip counter stored in the memory based on the highest ECU trip counter. The updated trip global trip counter is greater than the highest ECU trip counter. The vehicle computer 110 is further programmed to then provide a replacement synchronization message to the plurality of ECUs 126 on the vehicle communication network. The replacement synchronization message includes the updated global trip counter.

Turning now to FIG. 1, the vehicle 105 typically includes the vehicle computer 110, sensors 115, actuators 120 to actuate various vehicle components 125, and a vehicle communications module 130. The communications module 130 allows the vehicle computer 110 to communicate with a trusted remote server computer 140, a user device 145, and/or other vehicles, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 typically includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above and/or may include a dedicated electronic circuit including an ASIC that is manufactured for a particular operation, e.g., an ASIC for processing sensor data and/or communicating the sensor data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 110.

The vehicle computer 110 may operate and/or monitor the vehicle 105 in an autonomous, a semi-autonomous mode, or a non-autonomous (or manual) mode, i.e., can control and/or monitor operation of the vehicle 105, including controlling and/or monitoring components 125. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communication network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other vehicles and other items including as discussed below, fall within the definition of "object" herein.

The vehicle computer 110 is programmed to receive data from one or more sensors 115 substantially continuously, periodically, and/or when instructed by a trusted remote server computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a sign, a tree, etc., relative to the vehicle 105. As one example, the data may be image data of the environment around the vehicle 105. In such an example, the image data may include one or more objects and/or markings, e.g., lane markings, on or along a road. Image data herein means digital image data, e.g., comprising pixels with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

The vehicle 105 can include a plurality of ECUs 126 that are communicatively coupled via a network, typically on a vehicle communications bus or network. The ECUs 126 can be conventional computing devices, i.e., including one or more processors and one or more memories, programmed to provide operations such as disclosed herein. For example, an ECU 126 can be programmed to monitor and/or control one or more vehicle components 125. The ECUs 126 can be accessed via the vehicle communication network.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or DSRC., etc.) to another vehicle, and/or to a trusted remote server computer 140 (typically via direct radio frequency communications). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), cellular V2X (CV2X), and/or wide area networks (WAN), including the Internet, providing data communication services. For convenience, the label "V2X" is used herein for communications that may be vehicle-to-vehicle (V2V) and/or vehicle-to-infrastructure (V2I), and that may be provided by communication module 130 according to any suitable short-range communications mechanism, e.g., DSRC, cellular, or the like.

The network 135 represents one or more mechanisms by which a vehicle computer 110 may communicate with remote computing devices, e.g., the trusted remote server computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The trusted remote server computer 140 can be a conventional computing device, i.e., including one or more processors and one or more memories, programmed to provide operations such as disclosed herein. Further, the trusted remote server computer 140 can be accessed via the network 135, e.g., the Internet, a cellular network, and/or or some other wide area network.

The vehicle computer 110 can be programmed to manage startup and shutdown of the vehicle 105. For example, the vehicle computer 110 can startup or shutdown the vehicle 105 based on receiving a request from, e.g., the trusted remote server computer 140, user input to a power or start/stop button or the like in a passenger cabin of the vehicle 105, a key turning an ignition, etc. That is, the vehicle computer 110 can transition the vehicle 105 between activation states. In this context, an "activation state" specifies a power state of vehicle components 125, i.e., whether, and/or an amount that, a component 125 is electrically powered during startup and/or shutdown of the vehicle 105, e.g., unpowered, powered with a specific power supply, etc. The activation state can be one of an off state and an on state. In the on state, all vehicle components 125 are available to be actuated by the vehicle computer 110 to operate the vehicle 105. In the off state, the vehicle computer 110 and components 125 are substantially powered off to conserve energy when the vehicle 105 is not in use.

A power supply provides electricity to one or more components 125. The power supply can include one or more batteries, e.g., 12-volt lithium-ion batteries, and one or more power networks to supply power from the batteries to the components 125. In the on state, the power supply provides power to all of the vehicle components 125. In the off state, the power supply does not provide power to the vehicle components 125. The vehicle computer 110 can receive power from the power supply regardless of the activation state. The vehicle computer 110 can actuate the power supply based on the activation state.

The vehicle computer 110 stores a global trip counter 260, e.g., in a persistent memory of the vehicle computer 110. The vehicle computer 110 is programmed to increment the global trip counter 260 upon detecting the vehicle 105 startup. That is, the vehicle computer 110 increments the global trip counter 260 based on transitioning the vehicle 105 from the off state to the on state. Upon incrementing the global trip counter 260, the vehicle computer 110 overwrites, e.g., in the memory, the global trip counter 260 with the incremented global trip counter 260. The global trip counter 260 indicates a number of transitions of the vehicle 105 from the off state to the on state.

The vehicle computer 110 stores a reset counter 265, e.g., in a memory of the vehicle computer 110. The vehicle computer 110 is programmed to reset the reset counter 265 upon detecting the vehicle 105 startup. That is, the vehicle computer 110 sets the reset counter 265 to an initial or default value, e.g., zero, based on transitioning the vehicle 105 from the off state to the on state. Upon resetting the reset counter 265, the vehicle computer 110 overwrites, e.g., in the memory, the reset counter 265 with the default reset counter 265.

While the vehicle 105 is in the on state, the vehicle computer 110 is programmed to increment the reset counter 265 based on a timer expiring. For example, upon transitioning the vehicle 105 to the on state, the vehicle computer 110 can initiate a timer. When the timer expires, the vehicle computer 110 can increment the reset counter 265 and reset the timer. Upon incrementing the reset counter 265, the vehicle computer 110 overwrites, e.g., in the memory, the reset counter 265 with the incremented reset counter 265. A duration of the timer is a predetermined time, e.g., 500 milliseconds, 1 second, 5 seconds, etc. The duration of the timer may be stored, e.g., in the memory of the vehicle computer 110. The reset counter 265 is incremented during vehicle 105 operation to update a message authentication code, as discussed below.

While transitioning to the on state, the vehicle computer 110 is programmed to monitor the vehicle communication network to detect the plurality of ECUs 126. For example, the vehicle computer 110 can receive, via the vehicle communication network, one or more messages from one or more ECUs 126. The message may include an identifier, e.g., a string of bits that identifies the respective ECU 126.

The vehicle computer 110 can identify each ECU 126 based on the identifier included in the respective message matching an identifier stored, e.g., in a memory of the vehicle computer 110. The vehicle computer 110 can identify a new ECU 126 based on determining that the identifier of the new ECU 126 does not match any stored identifier. The vehicle computer 110 can identify a new ECU 126 when the new ECU 126 is added to the vehicle 105, e.g., to replace a previous ECU 126, or when the vehicle computer 110 is added to the vehicle 105, e.g., to replace a previous vehicle computer 110.

If the vehicle computer 110 fails to identify a new ECU 126, i.e., the vehicle computer 110 determines that each received identifier matches a corresponding stored identifier, then the vehicle computer 110 generates a counter message based on incrementing one of the global trip counter 260 or the reset counter 265. A counter message is a data string that includes the global trip counter 260 and the reset counter 265. For example, after incrementing one of the global trip counter 260 or the reset counter 265, the vehicle computer 110 can generate a counter message by combining, e.g., concatenating, the global trip counter 260 and the reset counter 265. When the global trip counter 260 is incremented, the counter message includes the incremented global trip counter 260 and the stored reset counter 265. When the reset counter 265 is incremented, the counter message includes the stored global trip counter 260 and the incremented reset counter 265.

Figure 2A:
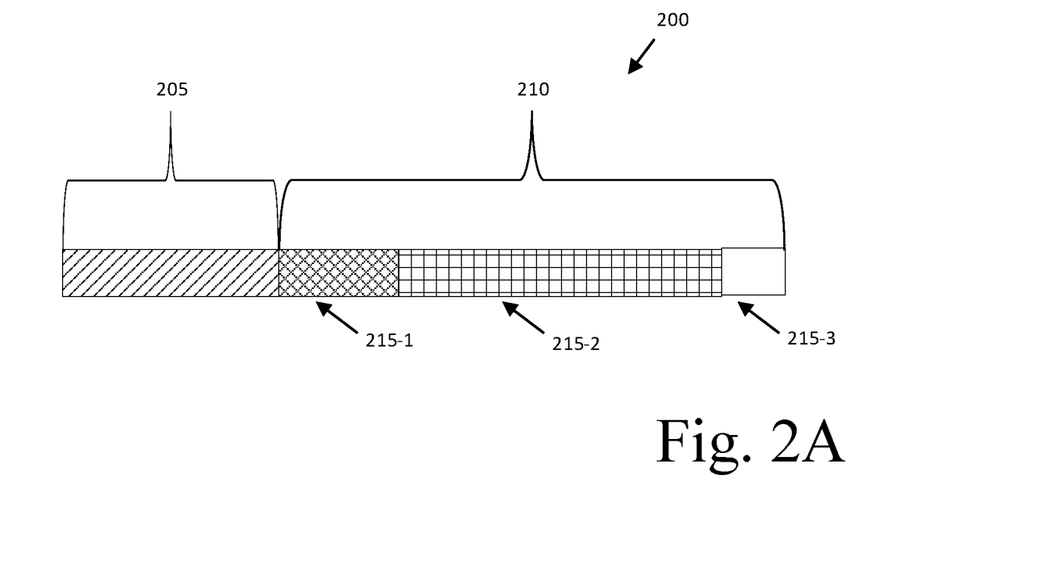
FIG. 2A is a block diagram illustrating an example synchronization message.

The vehicle computer 110 can generate a synchronization message 200 based on the counter message 270. The synchronization message 200 includes a header 205 and a payload 210 (see FIG. 2A). The header 205 may include an identifier, e.g., a string of bits that identifies the vehicle computer 110 that generated the synchronization message 200, a message type, a message size, etc. The payload 210 may include various data, i.e., message content. The payload can include sub-payloads or payload segments 215-1, 215-2, 215-3 (collectively, referred to as payload segments 215). The respective payload segments 215 in FIG. 2A are illustrated as being of different lengths to reflect that different payload segments 215 may include various amounts of data, and therefore may be of different sizes.

The payload 210 of the synchronization message 200 includes a message authentication code. The vehicle computer 110 can generate the message authentication code based on the counter message 270. The message authentication code is unique for each synchronization message 200 because each counter message 270 is unique. That is, different message authentication codes are generated for different counter messages 270 by incrementing either the global trip counter 260 or the reset counter 265. Accordingly, each counter message 270 varies from previous counter messages 270, i.e., either the global trip counter 260 or the reset counter 265 is incremented for each subsequent counter message 270. Therefore, the message authentication codes generated from the counter messages 270 will be different. Upon generating the message authentication code, the vehicle computer 110 can include the message authentication code in the payload 210, e.g., a specified payload segment 215, of the synchronization message 200.

Figure 2B:
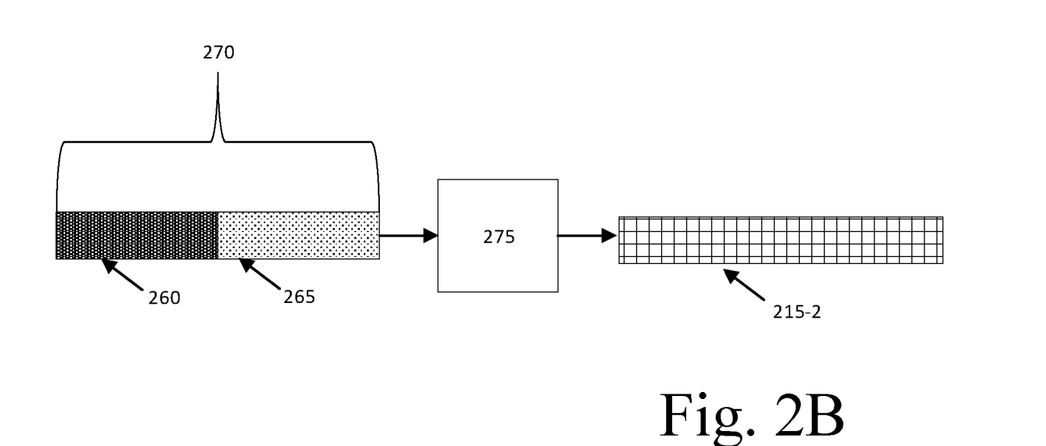
FIG. 2B is a block diagram illustrating an example permutation program.

To generate the message authentication code, the vehicle computer 110 can, for example, input the counter message 270 and an authentication key to a permutation program 275 (see FIG. 2B). The permutation program 275 (sometimes called a permutation generator) can be a conventional cryptographic program, e.g., an Advanced Encryption Standard (AES) algorithm. The permutation program 275 can rearrange the data in the counter message 270 in an order that is specified by the authentication key. That is, the permutation program 275 performs, for each portion of the counter message 270, one or more of a substitution, a change of order of segments in the message, or a mathematical operation according to block ciphers generated from the authentication key. For example, if the permutation program 275 is an AES algorithm, the vehicle computer 110 can identify a 16-bit portion of the counter message 270, apply an "exclusive-or" function (i.e., an XOR function) between the 16-bit portion and a portion of the authentication key to generate a first round string, and arrange first round string into a 4×4 grid. Then, the vehicle computer 110 can perform one of (1) shift respective positions of bits within the rows of the 4×4 grid, (2) substitute one of the bits in the 4×4 grid with a known substitution bit, (3) shift respective positions of bits within the columns of the 4×4 grid, or (4) scaling values of the bits by predetermined integers. The shifting, scaling, and substitution algorithms are determined according to the specific permutation program 275. The vehicle computer 110 can perform the permutation program 275 for the counter message 270 to generate the message authentication code.

The vehicle computer 110 can retrieve the authentication key, e.g., from the memory of the vehicle computer 110. The authentication key is a predetermined set of alphanumeric characters. For example, the authentication key can be a cryptographic key used in a conventional cryptographic program, e.g., Diffie-Hillman exchange, RSA encryption, AES, etc. The authentication key can be specified, e.g., by a manufacturer of the vehicle computer 110. The vehicle computer 110 can receive the authentication key from the trusted remote server computer 140, e.g., via the network 135.

Upon generating the synchronization message 200, the vehicle computer 110 can provide the synchronization message 200 to the plurality of ECUs 126. For example, the vehicle computer 110 can transmit the synchronization message 200 to the plurality of ECUs 126, e.g., via the vehicle communication network. The plurality of ECUs 126 can then update an ECU trip counter based on the synchronization message 200, as discussed further below.

If the vehicle computer 110 identifies a new ECU 126 on a vehicle communication network, then the vehicle computer 110 determines a highest ECU trip counter from the plurality of ECUs 126. An ECU trip counter is a trip counter stored by the respective ECU 126, e.g., in a memory of the respective ECU 126. For example, upon identifying the new ECU 126, the vehicle computer 110 can transmit, e.g., via the vehicle communication network, a request for each ECU 126 to provide its ECU trip counter. The vehicle computer 110 can then receive a response, including the ECU trip counter, from each ECU 126, e.g., via the vehicle communication network. As another example, the vehicle computer 110 can access a plurality of ECUs 126, e.g., via the vehicle communication network, and retrieve the ECU trip counter, e.g., from a memory of each accessed ECU 126. The vehicle computer 110 can then determine the highest ECU trip counter by comparing the ECU trip counters of the plurality of ECU's, e.g., all or most ECUs 126 in the vehicle 105.

The vehicle computer 110 then updates the global trip counter 260 based on the highest ECU trip counter to be greater than the highest ECU trip counter. For example, the vehicle computer 110 can set the global trip counter 260 equal to the highest ECU trip counter and then increment the global trip counter 260. As another example, the vehicle computer 110 can set the global trip counter 260 to be a predetermined number, e.g., 5, 10, etc., greater than the highest ECU trip counter. Upon updating the global trip counter 260, the vehicle computer 110 overwrites, e.g., in the memory, the global trip counter 260 with the updated global trip counter 260. Alternatively, in an example in which the vehicle computer 110 replaces a previous vehicle computer 110, the vehicle computer 110 can maintain the global trip counter 260 if the global trip counter 260 is greater than the highest ECU trip counter.

Upon updating the global trip counter 260, the vehicle computer 110 provides the authentication key to the new ECU 126. For example, the vehicle computer 110 can retrieve the authentication key, e.g., from a memory of the vehicle computer 110, and transmit the authentication key to the new ECU 126, e.g., via the vehicle communication network.

The vehicle computer 110 can generate a replacement counter message based on updating the global trip counter 260. A replacement counter message is a data string that includes the updated global trip counter 260 and the reset counter 265. For example, after updating the global trip counter 260, the vehicle computer 110 can generate the replacement counter message by combining, e.g., concatenating, the updated global trip counter 260 and the reset counter 265.

The vehicle computer 110 can generate a replacement synchronization message 220 based on the replacement counter message, e.g., in substantially the same manner as discussed above regarding generating the synchronization message 200. The replacement synchronization message 220 can include a header 225 and a payload 230, including payload segments 235 (see FIG. 2C). The payload 230 of the replacement synchronization message 220 includes a replacement message authentication code. The vehicle computer 110 can generate the replacement message authentication code by inputting the replacement counter message and the authentication key into the permutation program 275, e.g., as discussed above regarding the message authentication code. The vehicle computer 110 can then include the replacement message authentication code in the payload 230, e.g., a specified payload segment 235, of the replacement synchronization message 220. Upon generating the replacement synchronization message 220, the vehicle computer 110 can provide the replacement synchronization message 220 to the plurality of ECUs 126. For example, the vehicle computer 110 can transmit the replacement synchronization message 220 to the plurality of ECUs 126, e.g., via the vehicle communication network. The plurality of ECUs 126 can then update respective ECU trip counters based on the replacement synchronization message 220, as discussed further below.

Figure 2C:
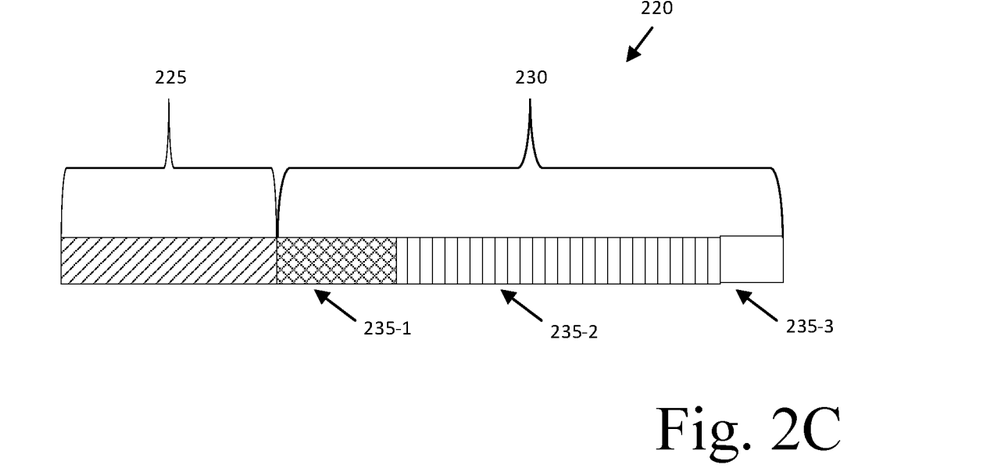
FIG. 2C is a block diagram illustrating an example replacement synchronization message.

The plurality of ECUs 126 in the control system 100 synchronize respective ECU trip counters with the global trip counter. The vehicle 105 can include other ECUs or computing devices, including on the vehicle network, that do not synchronize respective trip counters with the global trip counter. The ECUs 126 may be programmed to decode the message authentication code (which as just discussed may be a replacement message authentication code), e.g., based on the authentication key. The ECUs 126 can receive the authentication key from the vehicle computer 110, as discussed above. Upon receiving a synchronization message 200 or replacement synchronization message 220, the ECUs 126 can retrieve the authentication key, e.g., from a respective memory. The ECUs 126 can then rearrange the data in the synchronization (or replacement synchronization) message 200, 220 authentication code to decode and recover the counter (or replacement counter) message 270 by using the authentication key.

Upon recovering the counter (or replacement counter) message, the ECUs 126 can identify the global trip counter 260, e.g., based on the specified payload segment 215, 235. For example, the ECUs 126 can access the specified payload segment 215, 235 and retrieve the global trip counter 260. Additionally, the ECUs 126 can identify the reset counter 265, e.g., based on the specified payload segment 215, 235. For example, the ECUs 126 can access the specified payload segment 215, 235 and retrieve the reset counter 265.

The ECUs 126 then compare the global trip counter 260 to respective ECU trip counter. ECU trip counters are stored, e.g., in memories of the respective ECUs 126. If the global trip counter 260 is less than or equal to the ECU trip counter, then the ECUs 126 maintain the respective ECU trip counters. If the global trip counter 260 is greater than the ECU trip counter, then ECUs 126 update the respective ECU trip counters based on the global trip counter 260 to equal the global trip counter 260. Additionally, if the global trip counter 260 is equal to the ECU trip counter, then the ECUs 126 can update respective ECU reset counters to equal the reset counter 265 in the counter (or replacement counter) message 270. ECU reset counters are stored, e.g., in memories of the respective ECUs 126.

The ECUs 126 store a message counter, e.g., in memories of respective ECUs 126. Upon determining the reset counter 265 has been incremented, e.g., based on recovering the counter (or replacement counter) message 270, the ECUs 126 are programmed to reset the message counter, i.e., set the message counter to an initial or default value, e.g., zero. Upon resetting the message counter, the ECUs 126 overwrite, i.e., in their respective memories, the message counter with the default message counter. The message counter indicates a number of data messages 240 provided on the vehicle communication network prior to the reset counter 265 being incremented. Upon detecting a data message 240 on the vehicle communication network, the ECUs 126 increment the message counter stored in their respective memory.

The ECUs 126 can generate a total counter message based on the message counter, the ECU trip counter, and the ECU reset counter. A total counter message is a data string that includes the message counter, the ECU trip counter, and the ECU reset counter. For example, the ECUs 126 can generate the total counter message by combining, e.g., concatenating, the message counter, the ECU trip counter, and the ECU reset counter. Each counter may be included in a specified segment of the total counter message. The specified segment can be stored, e.g., in memories of the respective ECUs 126.

The ECUs 126 are programmed to provide data messages 240 on the vehicle communication network. For example, each ECU 126 can generate a data message 240 and transmit the data message 240 to other ECUs 126 and/or the vehicle computer 110, e.g., via the vehicle communication network. Similar to the synchronization (or replacement synchronization) message 200, 220, a data message 240 includes a header 245 and a payload 250 (see FIG. 2D). The header 245 may include an identifier, e.g., a string of bits that identifies the ECU 126 that generated the data message 240, a message type, a message size, etc.

Figure 2D:
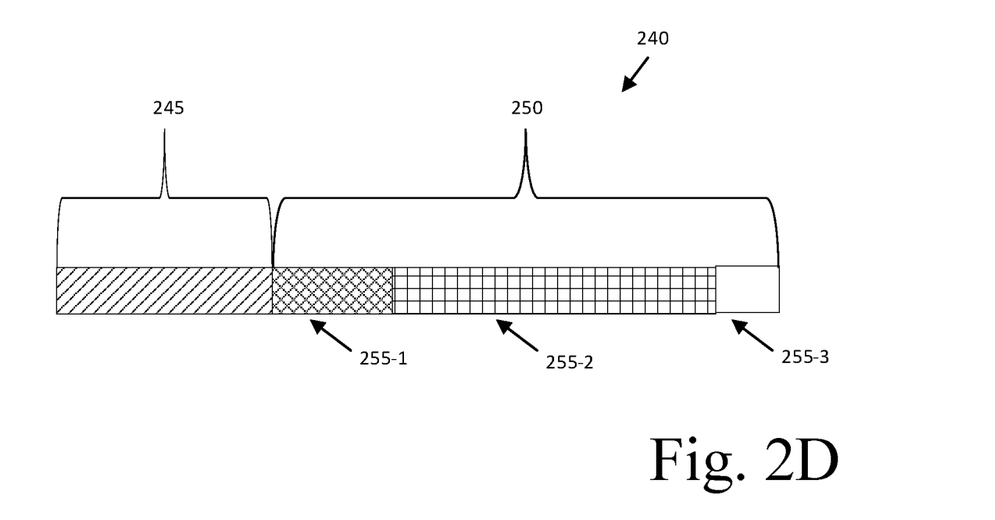
FIG. 2D is a block diagram illustrating an example data message.

The payload 250 may include various data, i.e., message content. The ECUs 126 may generate the payload 250 based on sensor 115 data. For example, the ECUs 126 may receive data from one or more sensors 115 monitoring at least one vehicle component 125. As is known, upon obtaining the sensor 115 data, the ECUs 126 can be programmed to encode and serialize, i.e., convert to a string of bits, data, such as data describing objects, data describing vehicle 105 operating conditions such as speed, heading, etc., data about a vehicle's 105 planned route, etc., so that the data can be included as the payload 250 in the data message 240. The payload 250 can include sub-payloads or payload segments 255-1, 255-2, 255-3 (collectively, referred to as payload segments 255). Each payload segment 255 can include data about a detected object from sensor 115 data, e.g., an object identifier, object dimensions, an object location, an object velocity, etc.

Additionally, the ECUs 126 may be programmed to, and can thus, authenticate the data message 240 prior to providing the data message 240 on the vehicle communication network. To authenticate the data message 240, the ECU 126 includes the data message authentication code in the payload 250, e.g., as a payload segment 255, of the data message 240. For example, the ECU 126 can include the data message authentication code in a payload segment 255 that is specified, e.g., by a vehicle 105 and/or component 125 manufacturer. The specified payload segment 255 can be stored, e.g., in respective memories of the ECUs 126. The ECU 126 can then transmit the authenticated data message 240 to the other ECUs 126, e.g., via the vehicle communication network.

An ECU 126 can generate a data message authentication code based on the total counter message. The ECU 126 can input the total counter message and the authentication key into the permutation program 275 to generate the data message authentication code, as discuss above regarding generating the message authentication code. The data message authentication code is unique for each data message 240 because each data message 240 is unique. That is, different data message authentication codes are generated for different data messages 240. For example, each data message 240 has a unique header 245 because the ECUs 126 increment the message counter upon detecting a data message 240 on the vehicle communication network. Accordingly, no two data messages 240 can have the same total counter message. Therefore, the data message authentication codes generated from corresponding data messages 240 will be different.

The vehicle computer 110 and/or the ECUs 126 can monitor the vehicle communication network to detect authenticated data messages 240. For example, a first ECU 126 and/or the vehicle computer 110 can receive, via the vehicle communication network, one or more authenticated data messages 240 from one or more other ECUs 126. Upon receiving an authenticated data message 240 from a second ECU 126, the first ECU 126 and/or the vehicle computer 110 can decode the authenticated data message 240 based on the authentication key, as discussed above. That is, the first ECU 126 and/or the vehicle computer 110 can recover the total counter message by decoding the data message authentication code in the authenticated data message 240. The first ECU 126 and/or the vehicle computer 110 can identify the ECU trip counter provided by the second ECU 126 in the total counter message, e.g., based on a specified segment of the total counter message.

The first ECU 126 then compares the ECU trip counter provided by the second ECU 126 to the ECU trip counter stored by the first ECU 126. If the ECU trip counter provided by the second ECU trip counter does not equal the ECU trip counter stored by the first ECU 126, then the ECU 126 can determine that an intruder device provided the authenticated data message 240. In this situation, the ECU 126 ignores the authenticated data message 240, which can reduce the likelihood that the first ECU 126 will act on false data. If the ECU trip counter provided by the second ECU trip counter is equal to the ECU trip counter stored by the first ECU 126, then the ECU 126 verifies the authenticated data message 240. In this situation, the first ECU 126 can store the authenticated data message 240, e.g., in a memory. Additionally, the first ECU 126 may act on the authenticated data message 240, e.g., by generating control signals to actuate one or more vehicle components 125.

Similarly, the vehicle computer 110 compares the ECU trip counter provided by the second ECU 126 to the global trip counter 260. If the ECU trip counter provided by the second ECU trip counter does not equal the global trip counter 260, then the vehicle computer 110 can determine that an intruder device provided the authenticated data message 240. In this situation, the vehicle computer 110 ignores the authenticated data message 240, which advantageously should reduce the likelihood that the vehicle computer 110 will act on false data. If the ECU trip counter provided by the second ECU trip counter is equal to the global trip counter 260, then the vehicle computer 110 verifies the authenticated data message 240. In this situation, the vehicle computer 110 can store the authenticated data message 240, e.g., in a memory. Additionally, the vehicle computer 110 may act on the authenticated data message 240, e.g., by generating control signals to actuate one or more vehicle components 125.

Figure 3:
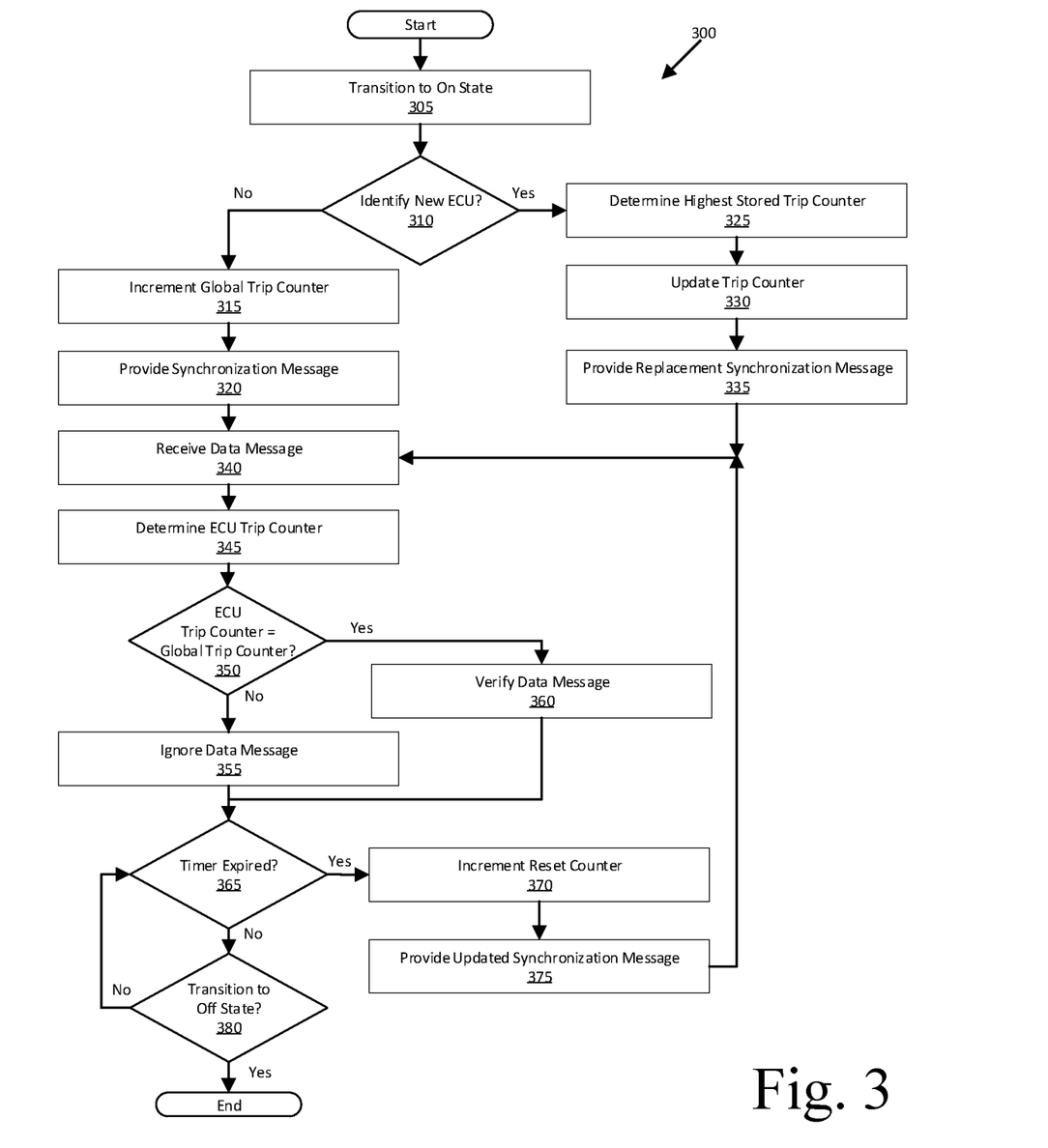
FIG. 3 is a flowchart of an example process for synchronizing a plurality of electronic control units (ECUs).

FIG. 3 is a diagram of an example process 300 for synchronizing a plurality of electronic control units (ECUs) 126. The process 300 begins in a block 305. The process 300 can be carried out by a vehicle computer 110 included in a vehicle 105 executing program instructions stored in a memory thereof.

In the block 305, the vehicle computer 110 executes programming to transition the vehicle 105 between activation states, specifically, to an on state. For example, the vehicle computer 110 can start up or shut down the vehicle 105 based on receiving a request from, e.g., the trusted remote server computer 140, user input to a power button in a passenger cabin of the vehicle 105, a key turning an ignition, etc. In the on state, all vehicle components 125 are available to be actuated by the vehicle computer 110 to operate the vehicle 105. The process 300 continues in a block 310.

In the block 310, the vehicle computer 110 determines whether a new ECU 126 is detected on the vehicle communication network. For example, while transitioning to the on state, the vehicle computer 110 can monitor the vehicle communication network to detect a plurality of ECUs 126. The vehicle computer 110 can receive a message from the ECUs 126. Each message can include an identifier of the respective ECU 126. The vehicle computer 110 can then compare the received identifiers to stored identifiers, as discussed above. The vehicle computer 110 identifies, i.e., detects, a new ECU 126 based on determining that a received ECU identifier does not match any stored ECU identifier. If the vehicle computer 110 fails to identify a new ECU 126, then the process continues in a block 315. Otherwise, the process 300 continues in a block 330.

In the block 315, the vehicle computer 110 increments a global trip counter 260. As set forth above, the global trip counter 260 indicates a number of transitions of the vehicle 105 from the off state to the on state. The vehicle computer 110 stores the global trip counter 260, e.g., in a memory. Additionally, the vehicle computer 110 can reset a reset counter 265. That is, the vehicle computer 110 can set the reset counter 265 to a default or initial value, e.g., zero. The vehicle computer 110 stores the reset counter 265, e.g., in a memory. The process 300 continues in a block 320.

In the block 320, the vehicle computer 110 provides a synchronization message 200 to the plurality of ECUs 126. For example, the vehicle computer 110 can generate a counter message 270 based on incrementing the global trip counter 260 or incrementing the reset counter 265. The counter message 270 is a data string that includes the global trip counter 260 and the reset counter 265, as discussed above. The vehicle computer 110 can then generate the synchronization message 200 based on the counter message 270. For example, the vehicle computer 110 can generate a message authentication code by inputting the counter message 270 and an authentication key, e.g., retrieved from a memory of the vehicle computer 110, into a permutation program 275, as discussed above. The vehicle computer 110 can then include the message authentication code in a payload 210, e.g., a specified payload segment 215, of the synchronization message 200, as discussed above. Upon generating the synchronization message 200, the vehicle computer 110 can transmit the synchronization message 200 to the plurality of ECUs 126, e.g., via the vehicle communication network. The process 300 continues in a block 340.

In the block 325, the vehicle computer 110 determines a highest ECU trip counter from the plurality of identified ECUs 126. As set forth above, an ECU trip counter is a trip counter stored by the respective ECU 126, e.g., in a memory of the respective ECU 126. For example, the vehicle computer 110 can transmit, e.g., via the vehicle communication network, a request for the ECUs 126 to provide their ECU trip counter. As another example, the vehicle computer 110 can access the ECUs 126, e.g., via the vehicle communication network, and retrieve the ECU trip counter, e.g., from a memory of the respective ECU 126. The vehicle computer 110 can then determine the highest ECU trip counter by comparing the ECU trip counters. The process 300 continues in a block 330.

In the block 330, the vehicle computer 110 then updates the global trip counter 260 based on the highest ECU trip counter to be greater than the highest ECU trip counter. For example, the vehicle computer 110 can set the global trip counter 260 equal to the highest ECU trip counter and then increment the global trip counter 260. As another example, the vehicle computer 110 can set the global trip counter 260 to be a predetermined number, e.g., 5, 10, etc., greater than the highest ECU trip counter. Upon updating the global trip counter 260, the vehicle computer 110 provides the authentication key to the new ECU 126, as discussed above. The process 300 continues in a block 335.

In the block 335, the vehicle computer 110 provides a replacement synchronization 220 message to the plurality of ECUs 126. For example, the vehicle computer 110 can generate a replacement counter message based on updating the global trip counter 260. The replacement counter message is a data string that includes the updated global trip counter 260 and the reset counter 265, as discussed above. The vehicle computer 110 can then generate the replacement synchronization message 220 based on the replacement counter message. For example, the vehicle computer 110 can generate a replacement message authentication code by inputting the replacement counter message and an authentication key, e.g., retrieved from a memory of the vehicle computer 110, into a permutation program 275, as discussed above. The vehicle computer 110 can then include the replacement message authentication code in a payload 230, e.g., a specified payload segment 235, of the replacement synchronization message 220, as discussed above. Upon generating the replacement synchronization message 220, the vehicle computer 110 can provide the replacement synchronization message 220 to the plurality of ECUs 126, as discussed above. The process 300 continues in a block 340.

In the block 340, the vehicle computer 110 monitors the vehicle communication network to detect authenticated data messages 240. For example, the vehicle computer 110 can receive one or more authenticated data messages from one or more ECUs 126. The process 300 continues in a block 345.

In the block 345, upon receiving an authenticated data message 240 from an ECU 126, the vehicle computer 110 determines an ECU trip counter in the authenticated data message 240. For example, the vehicle computer 110 can identify a data message authentication code in the authenticated data message 240, e.g., based on a specified payload segment 255, as discussed above. The vehicle computer 110 can then decode the data message authentication code and recover a total counter message by using the authentication key, as discussed above. The vehicle computer 110 can identify the ECU trip counter, e.g., based on a specified segment of the total counter message, as discussed above. The process 300 continues in a block 350.

In the block 350, the vehicle computer 110 compares the ECU trip counter to the global trip counter 260. If the ECU trip counter equals the global trip counter 260, then the process 300 continues in a block 360. Otherwise, the process 300 continues in a block 355.

In the block 355, the vehicle computer 110 ignores the authenticated data message 240. The vehicle computer 110 can determine that an intruder device provided the authenticated data message 240, as discussed above. The process 300 continues in a block 365.

In the block 360, the vehicle computer 110 verifies the authenticated data message 240. For example, the vehicle computer 110 may store the authenticated data message 240, e.g., in a memory. Additionally, the vehicle computer 110 may act on the authenticated data message 240, e.g., by generating control signals to actuate one or more vehicle components 125. The process 300 continues in a block 365.

In the block 365, the vehicle computer 110 determines whether a timer has expired. For example, upon transitioning the vehicle 105 to the on state, the vehicle computer 110 can initiate the timer. A duration of the timer may be predetermined and stored, e.g., in the memory of the vehicle computer 110. If the timer has expired, then the process 300 continues in a block 370. Otherwise, the process 300 continues in a block 380.

In the block 370, the vehicle computer 110 increments the reset counter 265. Additionally, the vehicle computer 110 resets and initiates the timer. The process 300 continues in a block 375.

In the block 375, the vehicle computer 110 provides an updated synchronization message 200. For example, the vehicle computer 110 can generate an updated counter message 270 that includes the global trip counter 260 and the incremented reset counter 265. The vehicle computer 110 can then generate an updated message authentication code by inputting the updated counter message 270 and the authentication key into the permutation program 275, as discussed above. The vehicle computer 110 can then include the updated message authentication code in a payload 210, e.g., a specified payload segment 215, of the updated synchronization message 200, as discussed above. Upon generating the updated synchronization message 200, the vehicle computer 110 can transmit the updated synchronization message 200 to the plurality of ECUs 126, e.g., via the vehicle communication network. The process 300 continues in the block 340.

In the block 380, the vehicle computer 110 determines whether the vehicle 105 is transitioning to an off state. For example, the vehicle computer 110 can transition the vehicle 105 to the off state based on receiving a request from, e.g., the trusted remote server computer 140, user input to a power button in a passenger cabin of the vehicle 105, a key turning an ignition, etc. In the off state, the vehicle computer 110 and components 125 are powered off to conserve energy when the vehicle 105 is not in use (or substantially powered off, e.g., certain components may remain in a sleep or power conservation mode or the like, and or may remain active, e.g., a vehicle security system). If the vehicle computer 110 fails to receive the request to transition the vehicle 105 to the off state, then the process 300 returns to the block 365. Otherwise, the process 300 ends.

Figure 4:
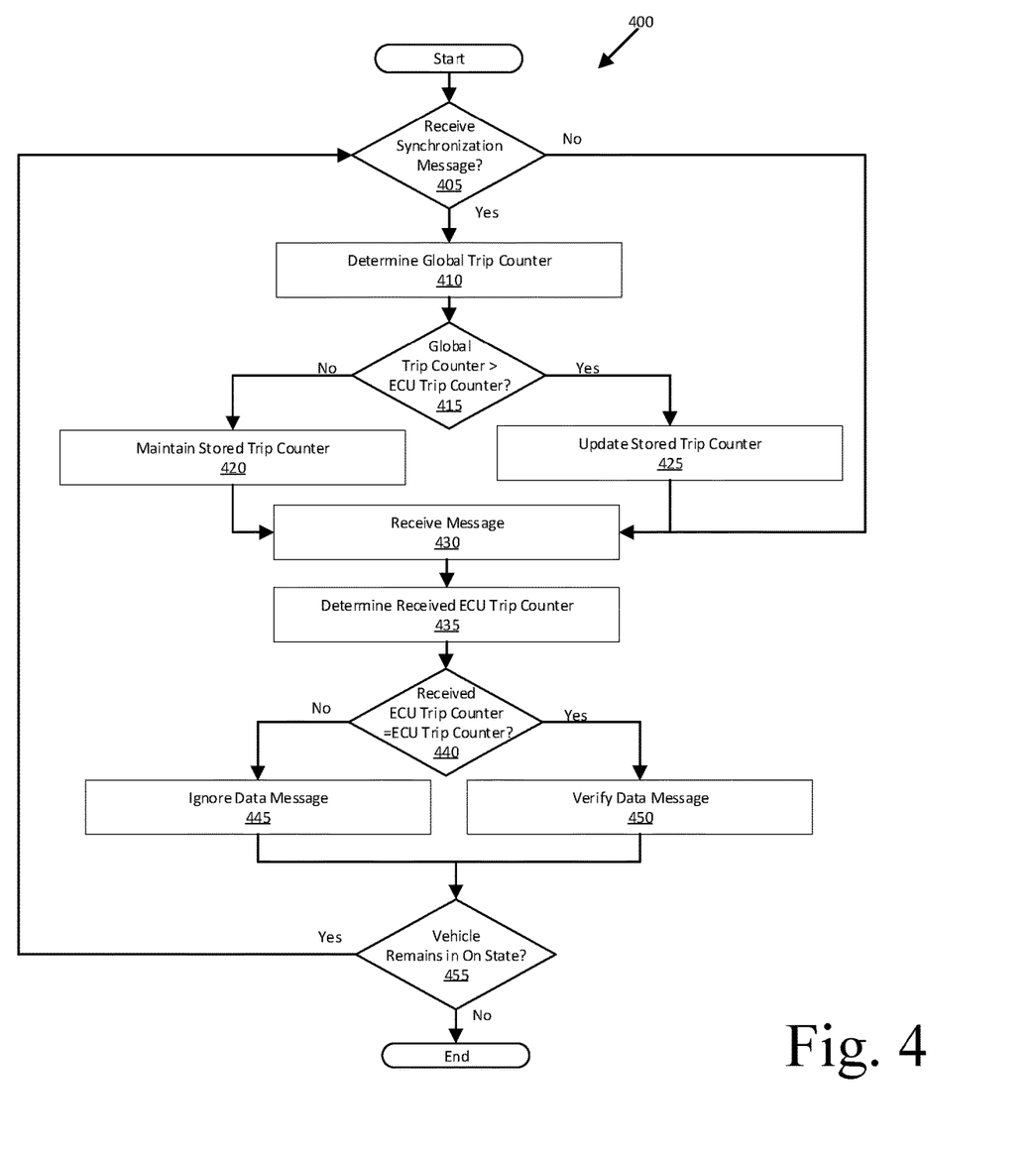
FIG. 4 is a flowchart of an example process for the plurality of ECUs to verify authenticated data messages.

FIG. 4 is a diagram of an example process 400 for verifying authenticated data messages 240 on a vehicle communications network. The process 400 begins in a block 405. The process 300 can be carried out by each of the ECUs 126 included in the vehicle 105 executing program instructions stored in a memory thereof.

In the block 405, the ECUs 126 determine whether a synchronization (or replacement synchronization) message 200, 220 is received from the vehicle computer 110. For example, the vehicle computer 110 can transmit the synchronization (or replacement synchronization) message 200, 220 to the ECUs 126, e.g., via the vehicle communications network. The synchronization (or replacement synchronization) message 200, 220 includes a header 205, 225 that can include a message type (as discussed above), which can allow the ECUs 126 to identify the synchronization (or replacement synchronization) message 200, 220 on the vehicle communication network. If an ECU 126 receives a synchronization (or replacement synchronization) message 200, 220, then the process 400 continues in a block 410. Otherwise, the process 400 continues in a block 430.

In the block 410, the ECUs 126 determine the global trip counter 260 in the synchronization (or replacement synchronization) message 200, 220. For example, the ECUs 126 can identify a message (or replacement message) authentication code in the synchronization (or replacement synchronization) message 200, 220, e.g., based on a specified payload segment 215, 235, as discussed above. The ECUs 126 can then decode the message (or replacement message) authentication code and recover a counter (or replacement) message 270 by using the authentication key, as discussed above. The ECUs 126 can identify the global trip counter 260, e.g., based on a specified segment of the counter (or replacement) message 270. The process 400 continues in a block 415.

In the block 415, the ECUs 126 compares the ECU trip counter to the global trip counter 260. If the global trip counter 260 is greater that the ECU trip counter, then the process 400 continues in a block 425. Otherwise, the process 400 continues in a block 420.

In the block 420, the ECUs 126 maintain the ECU trip counter. Additionally, if the global trip counter 260 is equal to the ECU trip counter, then the ECUs 126 can update an ECU reset counter to equal the reset counter 265 in the counter (or replacement) message 270. The process 400 continues in a block 430.

In the block 425, the ECUs 126 update the ECU trip counter based on the global trip counter 260 to equal the global trip counter 260. Additionally, the ECUs 126 can reset a respective ECU reset counter to a default or initial value. The process 400 continues in a block 430.

In the block 430, the ECUs 126 monitors the vehicle communication network to detect authenticated data messages 240. For example, a first ECU 126 can receive one or more authenticated data messages 240 from one or more other ECUs 126. The process 400 continues in a block 435.

In the block 435, upon receiving an authenticated data message 240 from a second ECU 126, the first ECU 126 determines an ECU trip counter in the authenticated data message 240. For example, the first ECU 126 can identify a data message authentication code in the authenticated data message 240, e.g., based on a specified payload segment 255, as discussed above. The first ECU 126 can then decode the data message authentication code and recover a total counter message by using the authentication key, as discussed above. The first ECU 126 can identify the ECU trip counter provided by the second ECU 126, e.g., based on a specified segment of the total counter message. The process 400 continues in a block 440.

In the block 440, the first ECU 126 compares the ECU trip counter provided by the second ECU 126 to the ECU trip counter stored by the first ECU 126. If the ECU trip counter provided by the second ECU 126 equals the ECU trip counter stored by the first ECU 126, then the process 400 continues in a block 450. Otherwise, the process 400 continues in a block 445.

In the block 445, the first ECU 126 ignores the authenticated data message 240. The first ECU 126 can determine that an intruder device provided the authenticated data message 240, as discussed above. The process 400 continues in a block 455.

In the block 450, the first ECU 126 verifies the authenticated data message 240. For example, the first ECU 126 may store the authenticated data message 240, e.g., in a memory. Additionally, the first ECU 126 may act on the authenticated data message 240, e.g., by generating control signals to actuate one or more vehicle components 125. The process 400 continues in a block 455.

In the block 455, the ECUs 126 determine whether the vehicle 105 remains in the on state. For example, the ECUs 126 can receive power from a power source, as discussed above. If the ECUs 126 receive power, e.g., at least a specified minimum amount of power, then the ECUs 126 determine that the vehicle remains in the on state. If the ECUs 126 fails to receive power, e.g., at least the specified minimum amount of power, then the ECUs 126 can determine that the vehicle 105 is transitioning to the off state. If the vehicle computer 110 remains in the on state, then the process 400 returns to the block 405. Otherwise, the process 400 ends.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:
monitor a vehicle communication network of a vehicle to detect a plurality of electronic control units (ECUs);
upon identifying a new ECU in the plurality of ECUs, determine, from the plurality of ECUs, a highest ECU trip counter, wherein a respective ECU trip counter is stored in each ECU;
update a global trip counter stored in the memory based on the highest ECU trip counter, wherein the global trip counter indicates a number of transitions of the vehicle from an off state to an on state and the updated trip global trip counter is greater than the highest ECU trip counter; and
then provide a replacement synchronization message to the plurality of ECUs on the vehicle communication network, the replacement synchronization message including the updated global trip counter for the plurality of ECUs to update respective ECU trip counters based on the global trip counter.

2. The system of claim 1, wherein the instructions further include instructions to, upon failing to detect the new ECU, provide a synchronization message to the plurality of ECUs on the vehicle communication network based on incrementing the global trip counter, the synchronization message including the incremented global trip counter.

3. The system of claim 2, wherein the instructions further include instructions to provide the synchronization message to the plurality of ECUs on the vehicle communication network based additionally on incrementing a reset counter, the synchronization message including the reset counter.

4. The system of claim 3, wherein the instructions further include instructions to increment the reset counter based on a timer expiring.

5. The system of claim 2, wherein the instructions further include instructions to increment the global trip counter based on detecting a vehicle startup.

6. The system of claim 2, wherein the instructions further include instructions to generate the synchronization message by inputting a counter message to a cryptographic program that encodes the counter message based on an authentication key, wherein the counter message includes the incremented global trip counter and a reset counter.

7. The system of claim 2, wherein the plurality of ECUs include respective processors and respective memories storing instructions executable by the respective processors to:
determine the incremented global trip counter in the synchronization message based on an authentication key; and
update the ECU trip counter based on determining that the incremented global trip counter is greater than the ECU trip counter.

8. The system of claim 7, wherein the instructions further include instructions to ignore data messages based on determining that the incremented global trip counter is less than the ECU trip counter.

9. The system of claim 7, wherein the instructions further include instructions to store data messages based on determining that the incremented global trip counter is equal to the ECU trip counter.

10. The system of claim 1, wherein the instructions further include instructions to, upon updating the global trip counter, provide an authentication key to the new ECU.

11. The system of claim 10, wherein the new ECU includes a second processor and a second memory storing instructions executable by the second processor to:
determine the updated global trip counter in the replacement synchronization message based on the authentication key; and
update the ECU trip counter based on determining that the updated global trip counter is greater than the ECU trip counter.

12. The system of claim 11, wherein the instructions further include instructions to, after updating the ECU trip counter, store data messages based on determining that the updated global trip counter is equal to the ECU trip counter.

13. The system of claim 1, wherein the instructions further include instructions to generate the replacement synchronization message by inputting a replacement counter message to a cryptographic program that encodes the replacement counter message based on an authentication key, wherein the replacement counter message includes the updated global trip counter and a reset counter.

14. The system of claim 1, wherein the plurality of ECUs include respective processors and respective memories storing instructions executable by the respective processors to update the ECU trip counter based on determining the updated global trip counter is greater than the ECU trip counter.

15. The system of claim 1, wherein the instructions further include instructions to update the global trip counter by setting the global trip counter equal to the highest ECU trip counter and then incrementing the global trip counter.

16. A method, comprising:
monitoring a vehicle communication network of a vehicle to detect a plurality of electronic control units (ECUs);
upon identifying a new ECU in the plurality of ECUs, determining, from the plurality of ECUs, a highest ECU trip counter, wherein a respective ECU trip counter is stored in each ECU;
updating a global trip counter stored in a memory based on the highest ECU trip counter, wherein the global trip counter indicates a number of transitions of the vehicle from an off state to an on state and the updated trip global trip counter is greater than the highest ECU trip counter; and
then providing a replacement synchronization message to the plurality of ECUs on the vehicle communication network, the replacement synchronization message including the updated global trip counter for the plurality of ECUs to update respective ECU trip counters based on the global trip counter.

17. The method of claim 16, further comprising, upon failing to detect the new ECU, providing a synchronization message to the plurality of ECUs on the vehicle communication network based on incrementing the global trip counter, the synchronization message including the incremented global trip counter.

18. The method of claim 16, further comprising generating the replacement synchronization message by inputting a replacement counter message to a cryptographic program that encodes the replacement counter message based on an authentication key, wherein the replacement counter message includes the updated global trip counter and a reset counter.

19. The method of claim 16, further comprising updating the ECU trip counter based on determining the updated global trip counter is greater than the ECU trip counter.

20. The method of claim 16, further comprising updating the global trip counter by setting the global trip counter equal to the highest ECU trip counter and then incrementing the global trip counter.

* * * * *